US011310032B2

(12) United States Patent
Xie et al.

(10) Patent No.: US 11,310,032 B2
(45) Date of Patent: Apr. 19, 2022

(54) SYSTEM AND METHOD FOR PARALLEL-PROCESSING BLOCKCHAIN TRANSACTIONS

(71) Applicant: ADVANCED NEW TECHNOLOGIES CO., LTD., Grand Cayman (KY)

(72) Inventors: Guilu Xie, Hangzhou (CN); Ning Xia, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 346 days.

(21) Appl. No.: 16/490,834

(22) PCT Filed: Mar. 28, 2019

(86) PCT No.: PCT/CN2019/080036
§ 371 (c)(1),
(2) Date: Sep. 3, 2019

(87) PCT Pub. No.: WO2019/120320
PCT Pub. Date: Jun. 27, 2019

(65) Prior Publication Data
US 2020/0044824 A1    Feb. 6, 2020

(51) Int. Cl.
*G06F 21/00* (2013.01)
*H04L 9/06* (2006.01)
(Continued)

(52) U.S. Cl.
CPC ........ *H04L 9/0637* (2013.01); *G06F 16/9027* (2019.01); *G06Q 20/10* (2013.01);
(Continued)

(58) Field of Classification Search
CPC . H04L 9/0637; H04L 9/0643; H04L 2209/56; H04L 2209/38; G06Q 20/10;
(Continued)

(56) References Cited

U.S. PATENT DOCUMENTS 9,881,176 B2   1/2018  Goldfarb et al.
10,042,782 B2  8/2018  Struttmann
(Continued)

FOREIGN PATENT DOCUMENTS

CN   106330431 A   1/2017
CN   108932348 A   12/2018
(Continued)

OTHER PUBLICATIONS

Examination Report No. 1 for Australian Application No. 2019204722 dated Feb. 5, 2020 (5 pages).
(Continued)

*Primary Examiner* — Ellen Tran
*Assistant Examiner* — Helai Salehi (57) ABSTRACT

Methods, systems, and apparatus, including computer programs encoded on computer storage media, for parallel-processing blockchain transactions are provided. One of the methods includes: obtaining a plurality of candidate transactions for adding to a blockchain; grouping the candidate transactions into one or more transaction groups; creating one or more copies of at least a portion of a data structure of a latest block of the blockchain; associating the one or more transaction groups respectively with the one or more copies of the data structure; executing the candidate transactions in each of the transaction groups and updating the associated copies of the data structure; and merging the updated copies of the data structure to obtain at least a portion of a new data structure of a new block to add to the blockchain.

18 Claims, 7 Drawing Sheets

(51) Int. Cl.
*G06F 16/901* (2019.01)
*G06Q 20/10* (2012.01)

(52) U.S. Cl.
CPC ........ *H04L 9/0643* (2013.01); *H04L 2209/38* (2013.01); *H04L 2209/56* (2013.01)

(58) Field of Classification Search
CPC .... G06F 16/9027; G06F 21/12; G06F 21/121; G06F 21/123; G06F 21/125; G06F 21/126; G06F 21/128; G06F 21/14
See application file for complete search history.

(56) References Cited

U.S. PATENT DOCUMENTS

| | | | |
|---|---|---|---|
| 10,089,489 | B2 | 10/2018 | Goldfarb et al. |
| 10,114,970 | B2 | 10/2018 | Goldfarb et al. |
| 10,121,019 | B2 | 11/2018 | Struttmann |
| 2017/0212781 | A1* | 7/2017 | Dillenberger ........... G06F 16/28 |
| 2017/0366353 | A1 | 12/2017 | Struttmann |
| 2018/0205552 | A1 | 7/2018 | Struttmann et al. |
| 2018/0247191 | A1 | 8/2018 | Katz et al. |
| 2018/0307857 | A1 | 10/2018 | Beecham et al. |
| 2018/0337787 | A1 | 11/2018 | Uhr et al. |
| 2018/0349621 | A1* | 12/2018 | Schvey ................ G06Q 20/223 |
| 2019/0026146 | A1 | 1/2019 | Peffers et al. |
| 2019/0065593 | A1 | 2/2019 | Barski |
| 2019/0079998 | A1* | 3/2019 | Rush .................... H04L 9/0643 |
| 2019/0081793 | A1* | 3/2019 | Martino .............. G06Q 20/065 |
| 2019/0361731 | A1 | 11/2019 | Qiu |
| 2020/0052884 | A1* | 2/2020 | Tong .................... H04L 9/3239 |
| 2020/0192873 | A1 | 6/2020 | Chang |

FOREIGN PATENT DOCUMENTS

| | | |
|---|---|---|
| CN | 109146677 A | 1/2019 |
| CN | 107423961 A | 12/2019 |
| TW | 201837821 A | 10/2018 |
| WO | 2018026883 A1 | 2/2018 |
| WO | 2018041066 A1 | 3/2018 |
| WO | 2018126065 A1 | 7/2018 |
| WO | 2018/144302 A1 | 8/2018 |
| WO | 2018/157778 A1 | 9/2018 |
| WO | 2018215951 A1 | 11/2018 |

OTHER PUBLICATIONS

Office Action for Canadian Application No. 3055108 dated Feb. 19, 2020 (5 pages).
Non-Final Office Action for U.S. Appl. No. 16/735,233 dated Mar. 14, 2020.
Notice of Allowance for U.S. Appl. No. 16/735,233 dated Apr. 17, 2020.
Search Report for European Application No. 19732219.1 dated May 13, 2020.
Grama et al., "Introduction to Parallel Computing, Principles of Parallel Algorithm Design", Jan. 1, 2003.
Etherem, "White Paper? Ethereum/wiki Wiki ? GitHub", Apr. 13, 2016.
Office Action for Japanese Application No. 2019-553286 dated Jan. 26, 2021.
Search Report for Taiwanese Application No. 108145068 dated Oct. 12, 2020.
Examination Report No. 3 for Australian Application No. 2019204722 dated Jul. 1, 2020.
Examination Report No. 3 for Australian Application No. 2019204722 dated Aug. 19, 2020.
Office Action for Canadian Application No. 3055108 dated Sep. 4, 2020.
Communication pursuant to Article 94(3) EPC for European Application No. 19732219.1 dated Jul. 6, 2021.
Leonor Frias et al., "Parallelization of Bulk Operations for STL Dictionaries," Aug. 28, 2007, Advances inn Intelligent Data Analysis XIX, Springer International Publishing.
Written Opinion of the International Searching Authority and International Search Report for International Application No. PCT/CN2019/080036, dated Dec. 27, 2019, 6 pages.

* cited by examiner

SYSTEM AND METHOD FOR PARALLEL-PROCESSING BLOCKCHAIN TRANSACTIONS

CROSS REFERENCE TO RELATED APPLICATION

This application is a national phase application of International Application No. PCT/CN2019/080036, filed on Mar. 28, 2019, the contents of which are incorporated by reference in its entirety.

TECHNICAL FIELD

This application generally relates to methods and devices for parallel-processing blockchain transactions.

BACKGROUND

Blockchain combines the openness of the internet with the security of cryptography to provide a faster and safer way to verify key information and establish trust. However, the software and hardware performances of blockchain transactions still lag behind traditional distributed systems in various parameters. In current technologies, to execute a plurality of transactions, the state tree is locked for the update and unlocked after the update, and the transactions are processed serially during the update. This serial processing manner limits the TPS (transaction per second) performance of blockchain. For example, only seven bitcoin transactions can be executed every second. Therefore, it is desirable to improve blockchain system performances such as the execution efficiency for accommodating larger volumes of transactions.

SUMMARY

Various embodiments of this specification include, but are not limited to, systems, methods, and non-transitory computer readable media for parallel-processing blockchain transactions.

In some embodiments, a computer-implemented method for parallel-processing blockchain transactions comprises: obtaining a plurality of candidate transactions for adding to a blockchain; grouping the candidate transactions into one or more transaction groups; creating one or more copies of at least a portion of a data structure of a latest block of the blockchain; associating the one or more transaction groups respectively with the one or more copies of the data structure; executing the candidate transactions in each of the transaction groups and updating the associated copies of the data structure; and merging the updated copies of the data structure to obtain at least a portion of a new data structure of a new block to add to the blockchain.

In other embodiments, the one or more transaction groups are independent transaction groups.

In still other embodiments, grouping the candidate transactions into one or more transaction groups comprises: grouping two or more of the candidate transactions each involving at least one common transaction account under a same transaction group of the one or more transaction groups.

In yet other embodiments, grouping the candidate transactions into one or more transaction groups comprises: grouping two or more of the candidate transactions that do not involve any common transaction account under different transaction groups of the one or more transaction groups.

In some embodiments, the blockchain is based on an Account/Balance Model; and the data structure comprises a Merkle Patricia tree comprising a single state root node stored in the latest block and a plurality of intermediate nodes and leaf nodes not stored in the latest block.

In other embodiments, executing the candidate transactions in each of the transaction groups and updating the associated copies of the data structure comprises: executing the candidate transactions in each of the transaction groups and updating the associated copies of the data structure in parallel.

In yet other embodiments, executing the candidate transactions in the corresponding transaction groups comprises: executing the candidate transactions in the corresponding transaction groups by a multi-core processor.

In still other embodiments, updating the associated copies of the data structure comprises at least one of: updating a balance of a transaction account in one of the associated copies of the data structure; removing the transaction account; or adding a new transaction account.

In some embodiments, merging the updated copies of the data structure comprises: updating at least the portion of the data structure of the latest block of the blockchain by combining and incorporating updates made in the updated copies of the data structure.

In other embodiments, the method further comprises: adding the new block to the blockchain, wherein the portion of the new data structure comprises a new state root node, and the new block comprises the new state root node.

In yet other embodiments, a system for parallel-processing blockchain transactions comprises: one or more processors; and one or more computer-readable memories coupled to the one or more processors and having instructions stored thereon that are executable by the one or more processors to perform the method of any of the preceding embodiments.

In still other embodiments, an apparatus for parallel-processing blockchain transactions comprises a plurality of modules for performing the method of any of the preceding embodiments.

In some embodiments, a non-transitory computer-readable medium has stored therein instructions that, when executed by a processor of a device, cause the device to perform the method of any of the preceding embodiments.

In other embodiments, a system for parallel-processing blockchain transactions comprises one or more processors and one or more non-transitory computer-readable memories coupled to the one or more processors and configured with instructions executable by the one or more processors to cause the system to perform operations comprising: obtaining a plurality of candidate transactions for adding to a blockchain; grouping the candidate transactions into one or more transaction groups; creating one or more copies of at least a portion of a data structure of a latest block of the blockchain; associating the one or more transaction groups respectively with the one or more copies of the data structure; executing the candidate transactions in each of the transaction groups and updating the associated copies of the data structure; and merging the updated copies of the data structure to obtain at least a portion of a new data structure of a new block to add to the blockchain.

In still other embodiments, the processor comprises a multi-core processor.

In yet other embodiments, a non-transitory computer-readable storage medium is configured with instructions executable by one or more processors to cause the one or more processors to perform operations comprising: obtaining a plurality of candidate transactions for adding to a blockchain; grouping the candidate transactions into one or more transaction groups; creating one or more copies of at least a portion of a data structure of a latest block of the blockchain; associating the one or more transaction groups respectively with the one or more copies of the data structure; executing the candidate transactions in each of the transaction groups and updating the associated copies of the data structure; and merging the updated copies of the data structure to obtain at least a portion of a new data structure of a new block to add to the blockchain.

According to some embodiments, an apparatus for parallel-processing blockchain transactions comprises an obtaining module for obtaining a plurality of candidate transactions for adding to a blockchain; a grouping module for grouping the candidate transactions into one or more transaction groups; a creating module for creating one or more copies of at least a portion of a data structure of a latest block of the blockchain; an associating module for associating the one or more transaction groups respectively with the one or more copies of the data structure; an executing module for executing the candidate transactions in each of the transaction groups and updating the associated copies of the data structure; and a merging module for merging the updated copies of the data structure to obtain at least a portion of a new data structure of a new block to add to the blockchain.

Embodiments disclosed in the specification have one or more technical effects. In some embodiments, after consensus verification (mining) a pool of candidate transactions and before execution, the candidate transactions may be grouped into various independent groups. In other embodiments, the groups of candidate transactions may be executed simultaneously by a multi-core processor (e.g., CPU) updating copies of the state tree. In still other embodiments, by creating the copies of the state tree data structure, independent groups of candidate transactions can be processed in parallel in the copies without having to lock the data structure. In yet other embodiments, after all independent groups are updated, the copies of state tree data structure can be merged to obtain the new data structure of the new block, thus achieving efficient mining of the new block. In some embodiments, blockchain performances such as TPS and other processing efficiency measurements can be improved significantly.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as limiting.

DETAILED DESCRIPTION

Blockchain may be considered as a decentralized database, commonly referred to as a distributed ledger because the operation is performed by various nodes (e.g., computing devices) in a network. Any information may be written to the blockchain and saved or read from it. Anyone may set up a server and join the blockchain network to become a node. Any node may contribute computing power to maintain the blockchain by performing complex computations, such as hash calculation to add a block to a current blockchain, and the added block may contain various types of data or information. The node that contributed the computing power for the added block may be rewarded with a token (e.g., digital currency unit). Since the blockchain has no central node, each node is equal and holds the entire blockchain database.

Nodes are, for example, computing devices or large computer systems that support the blockchain network and keep it running smoothly. In an exemplary "proof of work" system, there are two types of nodes, full nodes and lightweight nodes. Full nodes keep a complete copy of the blockchain. The full nodes on the blockchain network validate transactions and blocks they receive and relay them to connected peers for providing consensus verification of the transactions. Lightweight nodes, on the other hand, only download a fraction of the blockchain. For example, lightweight nodes are used for digital currency transactions. A lightweight node will communicate to a full node when it wants to trans act.

This decentralization property can help prevent the emergence of a management center in a controlled position. For example, the maintenance of the bitcoin/ethereum blockchain is performed by the network of communication nodes of the bitcoin/ethereum software in the running area. That is, instead of banks, institutions, or administrators in the traditional sense, multiple intermediaries exist in a form of computer servers executing bitcoin/ethereum software. These computer servers form a network connected via the Internet, wherein anyone can potentially join the network. Transactions accommodated by the network may be of a form: "user A wants to send Z bitcoins/ethers to user B," wherein the transactions are broadcast to the network using readily available software applications. The computer servers' function as bitcoin/ethereum servers that are operable to validate these financial transactions, add a record of them to their copy of the ledger, and then broadcast these ledger additions to other servers of the network. This specification uses one or more blockchains or digital currencies, such as bitcoin and ethereum, as examples. A person with ordinary skill in the art should appreciate that the technical solutions disclosed in this specification can use or apply to other type of blockchains and digital currencies.

Figure 1:
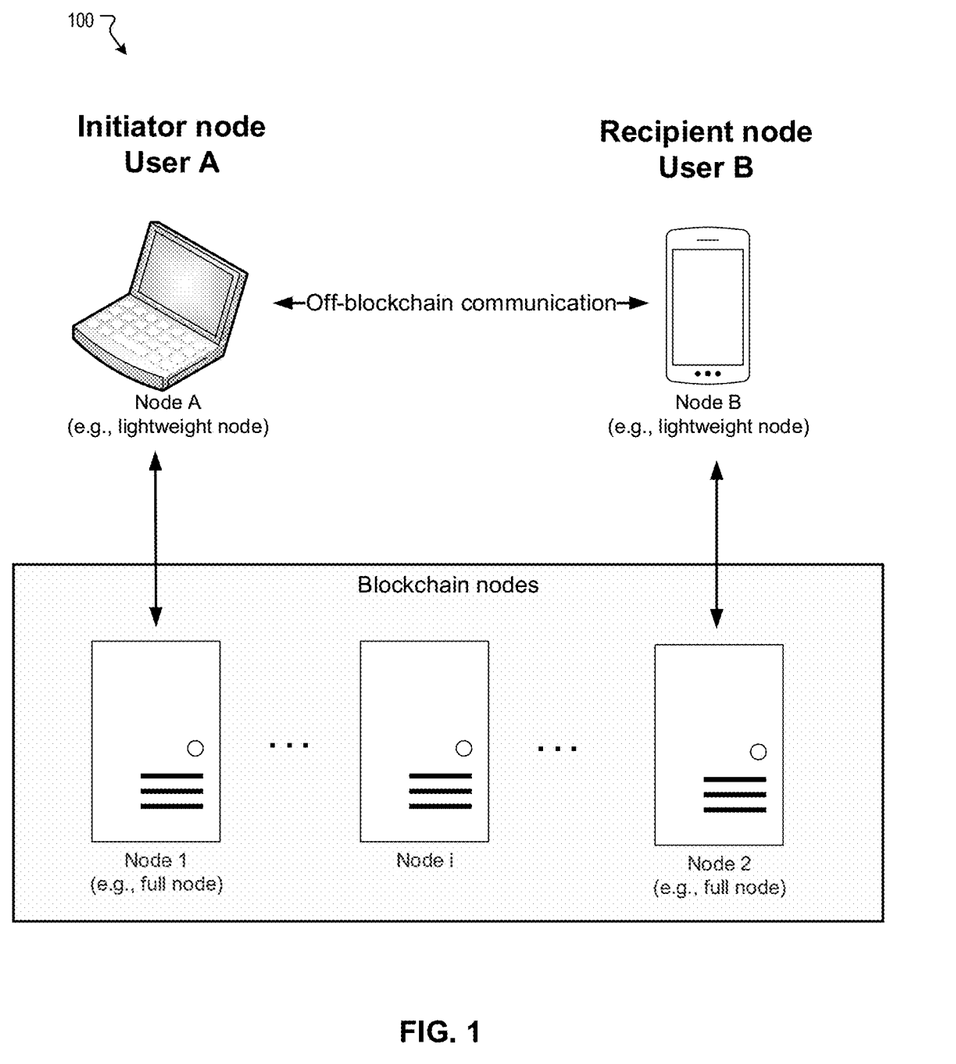
FIG. 1 illustrates an exemplary system for parallel-processing blockchain transactions, in accordance with various embodiments.

FIG. 1 shows an exemplary system 100 for performing various disclosed steps and methods, in accordance with various embodiments. As shown, a blockchain network may comprise a plurality of blockchain nodes (e.g., node 1, node 2, . . . , and node i). The blockchain nodes may be implemented in servers, computers, etc. Each blockchain node may correspond to one or more physical hardware devices or virtual devices coupled together via various types of communication methods such as TCP/IP. Depending on the classifications, the blockchain nodes may comprise full nodes, Geth nodes, consensus nodes, etc. In one example, under the "proof of work" system, the blockchain nodes may comprise devices of miners applying their hardware or computational power to verify the blocks of blockchain and receiving rewards. Blockchain nodes that do not perform such verification comprise lightweight nodes. In another example, under the "proof of stake/service" system, blockchain nodes with certain level of voting power may be referred to as consensus/master nodes, which assume the responsibility of transaction verification, as opposed to non-consensus nodes. Consensus nodes may generate new blockchain blocks and make decisions for the blockchain, for example, setting the service fees for the blockchain. The consensus nodes may be associated with a large amount of cryptocurrencies and verify new transactions based on certain consensus rules mutually agreed upon. In this specification, full nodes, consensus nodes, or other equivalent nodes in the above-described or another blockchain system can verify the transactions as the blockchain nodes.

Also, as shown in FIG. 1, user A may want to transact with user B by transferring some asset in user A's account to user B's account. User A and user B may use corresponding devices installed with an appropriate blockchain software (e.g., cryptocurrency wallet) for the transaction. User A's device may be referred to as an initiator node A that initiates a transaction with user B's device referred to as recipient node B. Node A may access the blockchain through communication with node 1, and node B may access the blockchain through communication with node 2. For example, node A and node B may submit transactions to the blockchain through node 1 and node 2 to request adding the transactions to the blockchain. Off the blockchain, node A and node B may have other channels of communication (e.g., regular internet communication without going through nodes 1 and 2). In some embodiments, the blockchain software on node A may be considered a front-end of the blockchain node 1, and the blockchain node 1 runs a back-end of the blockchain software.

Each of the nodes in FIG. 1 may comprise a processor (e.g., a multi-core processor) and a non-transitory computer-readable storage medium configured with instructions executable by the processor to cause the node (e.g., the processor) to perform various steps for parallel-processing blockchain transactions described herein. The each node may be installed with a software (e.g., transaction program) and/or hardware (e.g., wires, wireless connections) to communicate with other nodes and/or other devices. For example, user devices such as node A and node B may be installed with a user-end software such as cryptocurrency wallet, and the blockchain nodes may be installed with a blockchain transaction processing software. Further details of the node hardware and software are described later with reference to FIG. 6.

The blockchain nodes may each couple to a memory. In some embodiments, the memory may store a pool database. The pool database may be accessible to the plurality of blockchain nodes in a distributed manner. For example, the pool database may be respectively stored in the memories of the blockchain nodes. The pool database may store a plurality of transactions submitted by the one or more user devices such as nodes A and B operated by users.

In some embodiments, after receiving a transaction request of an unconfirmed transaction, the unconfirmed transaction may be stored in the pool database. One or more blockchain nodes may perform consensus verification to verify the unconfirmed transaction. Upon successful verification, the blockchain nodes may pack the transaction to add to the blockchain. If the verification fails, the unconfirmed transaction is rejected.

Verifying the transactions and adding to the blockchain is referred to as "mining," and those who do such maintenance are rewarded with newly created bitcoins/ethers and transaction fees. For example, blockchain nodes may determine if the transactions are valid based on a set of consensus rules the blockchain network has agreed to. Miners may be located on any continent and process payments by verifying each transaction as valid and adding it to the blockchain. Such verification is achieved via consensus provided by a plurality of miners and assumes that there is no systematic collusion. In the end, all data will be consistent, because the computation has to meet certain requirements to be valid and all blockchain nodes will be synchronized to ensure that the blockchain is consistent. Thus, data can be consistently stored in a distributed system of blockchain nodes.

Through the mining process, transactions such as asset transfers are verified and added to a growing chain of blocks of a blockchain by network nodes. By traversing the entire blockchain, the verification may include, for example, whether the paying party has access to the transferring asset, whether the asset had been spent before, whether the transferring amount is correct, etc. For example, in a hypothetical transaction signed off by a sender such as an initiator node and submitted to a coupled blockchain node, the coupled blockchain node may broadcast the proposed transaction to the blockchain network for the blockchain nodes to mine. A miner needs to check if the transaction is eligible to be executed according to the blockchain history. If the sender's wallet balance has sufficient funds according to the existing blockchain history, the transaction is considered valid and can be added to the block. Once verified, the asset transfers may be included in the next block to be added to the blockchain.

A block is much like a database record. Each time writing data creates a block. These blocks are linked and protected using cryptography to become interconnected networks. Each block is connected to the previous block, which is also the origin of the name "blockchain." Each block usually contains the cryptographic hash of the previous block, the generation time, and the actual data. For instance, each block contains two parts: a block header to record the feature value of the current block, and a body to record actual data (e.g., transaction data). The chain of blocks is linked via the block headers. Each block header may contain multiple feature values, such as version, previous block hash, merkle root, timestamp, difficulty target, and a proof of work nonce (or nonce in short). The previous block hash contains not only the address of the previous block, but also the hash of the data inside the previous block, thus making the blockchains immutable. The nonce is a number which, when included, yields a hash with a specified number of leading zero bits.

For mining, the hash of the contents of the new block is taken by a blockchain node. The nonce (e.g., random string) is appended to the hash to obtain a new string. The new string is hashed again. The final hash is then compared to the difficulty target (e.g., a level) and determined whether the final hash is actually less than the difficulty target or not. If not, then the nonce is changed and the process repeats again. If yes, then the block is added to the chain and the public ledger is updated and alerted of the addition. The blockchain node responsible for the successful addition is rewarded with bitcoins/ethers, for example, by adding a reward transaction to itself into the new block. Additionally or alternatively, a transaction initiator may include a transaction fee to reward the blockchain node that successfully mines the transaction into the newly added block.

That is, for every output "Y", if k is chosen from a distribution with high min-entropy it is infeasible to find an input x such that H(k|x)=Y, where k is the nonce, x is the hash of the block, Y is the difficulty target, and "|" denotes concatenation. On account of cryptographic hashes being essentially random, in the sense that their output cannot be predicted from their inputs, there is only one known way to find the nonce: to try out integers one after the other, for example 1, then 2, then 3, and so on, which may be known as brute-force. The larger the number of leading zeros, the longer on average it will take to find a requisite nonce Y. In one example, the bitcoin system constantly adjusts the number of leading zeros, so that the average time to find a nonce is about ten minutes. That way, as processing capabilities of computing hardware increase with time, over the years, the bitcoin protocol will simply require more leading zero bits to make mining always take a duration of about ten minutes to implement.

As described, hashing is an important cornerstone for blockchain. The hash algorithm can be understood as a function that compresses messages of any length into a fixed-length message digest. More commonly used are MD5 and SHA. In some embodiments, the hash length of the blockchain is 256 bits, which means that no matter what the original content is, a 256-bit binary number is finally calculated. And it can be guaranteed that the corresponding hash is unique as long as the original content is different. For example, the hash of the string "123" is a8fdc205a9f19cc1c7507a60c401b13d11d7fd0 (hexadecimal), which has 256 bits when converted to binary, and only "123" has this hash. The hash algorithm in the blockchain is irreversible, that is, the forward calculation is easy (from "123" to a8fdc205a9f19cc1c7507a60c4f01c7507a60c4f01b13d11d7fd0), and the reverse calculation cannot be done even if all computing resources are exhausted. Thus, the hash of each block of the blockchain is unique.

Further, if the content of the block changes, its hash will change. The block and the hash are in one-to-one correspondence, and the hash of each block is specifically calculated for the block header. That is, the feature values of the block headers are connected to form a long string, and then the hash is calculated for the string. For example, "Hash=SHA256 (block header)" is a block hash calculation formula, SHA256 is a blockchain hash algorithm applied to block header. The hash is uniquely determined by the block header, and not the block body. As mentioned above, the block header contains a lot of content, including the hash of the current block, and the hash of the previous block. This means that if the contents of the current block change, or if the hash of the previous block changes, it will cause a hash change in the current block. If hacker modifies a block, the hash of that block changes. In order for a later block to connect to the modified block, the hacker must modify all subsequent blocks in turn, because the next block must contain the hash of the previous block. Otherwise the modified block will be detached from the blockchain. Due to design reasons, hash calculations are time-consuming, and it is almost impossible to modify multiple blocks in a short period of time unless the hacker has mastered more than 51% of the computing power of the entire network. Thus, the blockchain guarantees its own reliability, and once the data is written, it cannot be tampered with.

Once the miner finds the hash (that is, an eligible signature or solution) for the new block, the miner broadcasts this signature to all the other miners (blockchain nodes). Other miners now verify in their turn if that solution corresponds with the problem of the sender's block (that is, determine if the hash input actually results in that signature). If the solution is valid, the other miners will confirm the solution and agree that the new block can be added to the blockchain. Thus, the consensus of the new block is reached. This is also known as "proof of work." The block for which consensus has been reached can now be added to the blockchain and is broadcast to all blockchain nodes on the network along with its signature. The blockchain nodes will accept the block and save it to their transaction data as long as the transactions inside the block correspond correctly with the current wallet balances (transaction history) at that point in time. Every time a new block gets added on top of this block, the addition also counts as another "confirmation" for the blocks before it. For example, if a transaction is included in block 502, and the blockchain is 507 blocks long, it means that the transaction has five confirmations (corresponding to blocks 507 to 502). The more confirmations the transaction has, the harder it is for attackers to alter.

As shown, a blockchain is a cryptographically secure transactional singleton machine with shared-state. "Cryptographically secure" may indicate that the creation of digital currency is secured by complex mathematical algorithms that are obscenely hard to break. They make it nearly impossible to cheat the system (e.g., create fake transactions, erase transactions, etc.). "Transactional singleton machine" may indicate that there is a single canonical instance of the machine responsible for all the transactions being created in the system. In other words, there is a single global truth that everyone believes in. "With shared-state" may indicate that the state stored on this machine is shared and open to everyone. Bitcoin and ethereum both implement the blockchain paradigm but based on different models discussed below in the context of blockchain transactions. The described models are merely exemplary, and the disclosed systems and models can be implemented based on other models.

In some embodiments, to transfer certain assets to user B, user A may construct a record containing information about the transaction through a blockchain node. The subject matter of the transaction may comprise, for example, money, token, digital currency, contract, deed, medical record, customer detail, stock, bond, equity, or any other asset that can be described in digital form. The record may be signed with user A's signing key (private key) and contains user A's public verification key and user B's public verification key. The record bundled with other record that took place in the same time window in a new block may be broadcast to the full nodes. Upon receiving the records, the full nodes may work on incorporating the records into the ledger of all transactions that have ever taken place in the blockchain system, adding the new block to a previously-accepted blockchain through the above-described mining process, and validating the new block against the network's consensus rules.

Bitcoin is based on the UTXO (unspent transaction output) model. Under UTXO, assets are represented by outputs of blockchain transactions that have not been spent, which can be used as inputs in new transactions. The outputs may be no less than the inputs for each transaction. For example, user A's asset to be transferred may be in a form of UTXO. To spend (transact) the asset, user A has to sign off with the private key. Bitcoin is an example of a digital currency that uses UTXO model. In the case of a valid blockchain transaction, unspent outputs may be used to effect further transactions. In some embodiments, only unspent outputs may be used in further transactions to prevent double-spending and fraud. For this reason, inputs on a blockchain are deleted when a transaction occurs, whilst at the same time, outputs are created in the form of UTXOs. These unspent transaction outputs may be used (by the holders of private keys, for example, persons with digital currency wallets) for the purpose of future transactions.

Ethereum is based on the Account/Balance model (or referred to as Account-based Transaction Model), which keeps track of the balance of each account as a global state. In a transaction, the balance of an account is checked to make sure it is larger than or equal to the spending transaction amount. An example of how Account/Balance model works in ethereum is provided:

1. Alice gains 5 ethers through mining. It is recorded in the system that Alice has 5 ethers.
2. Alice wants to give Bob 1 ether, so the system will first deduct 1 ether from Alice's account, so Alice now has 4 ethers.
3. The system then increases Bob's account by 1 ether. The system knows that Bob has 2 ethers to begin with, therefore Bob's balance is increased to 3 ethers.

The ethereum blockchain may be regarded as a transaction-based state machine. In computer science, a state machine refers to something that will read a series of inputs and, based on those inputs, will transition to a new state. Under the Account/Balance Model, the blockchain (e.g., ethereum blockchain) begins life at a "genesis state," which corresponds to the very first block (genesis block) of the blockchain. From this point (genesis state at block 0) onward, activities such as transactions, contracts, and mining will continually change the "state" of the blockchain. For example, when transactions are executed, this genesis state transitions into state 1 and then to state 2 when more transactions are executed and so forth. The state of ethereum has millions of transactions grouped into "blocks." A block contains a series of transactions, and each block is chained together with its previous block as described earlier. To cause a transition from one state to the next, a transaction must be valid. For a transaction to be considered valid, it goes through a validation process known as mining as described earlier. Corresponding to the "transactional singleton machine with shared-state" mentioned above, the correct current state is a single global truth, which every blockchain node must accept.

The global state of ethereum comprises a mapping between account addresses and the account states. The accounts are able to interact with one another through a message-passing Framework. Each account has a state associated with it and a 20-byte address. An address in ethereum is a 160-bit identifier used to identify any account. There are two types of accounts: externally owned accounts, which are controlled by private keys and have no code associated with them; and contract accounts, which are controlled by their contract code and have code associated with them. An externally owned account can send messages to other externally owned accounts or to other contract accounts by creating and signing a transaction using its private key. A message between two externally owned accounts is simply a value transfer. But a message from an externally owned account to a contract account activates the contract account's code, allowing it to perform various actions (e.g. transfer tokens, write to internal storage, mint new tokens, perform some calculation, create new contracts, etc.). Unlike externally owned accounts, contract accounts cannot initiate new transactions on their own. Instead, contract accounts can only fire transactions in response to other transactions they have received (from an externally owned account or from another contract account). Therefore, any action that occurs on the ethereum blockchain may be set in motion by transactions fired from externally controlled accounts.

The account state may comprise four components, which are present regardless of the type of account: account nonce, balance, storageRoot, and codeHash. For account nonce, if the account is an externally owned account, this number represents the number of transactions sent from the account's address. If the account is a contract account, the nonce is the number of contracts created by the account. Balance is the number of Wei owned by this address. There are 1e+18 Wei per Ether. StorageRoot is a hash of the state root node of a Merkle Patricia tree (MPT). This tree encodes the hash of the storage contents of this account and is empty by default. CodeHash is the hash of the EVM (Ethereum Virtual Machine) code of this account. For contract accounts, this is the code that gets hashed and stored as the codeHash. For externally owned accounts, the codeHash field is the hash of the empty string.

The mapping between account addresses and the account states is stored in a data structure known as a Merkle Patricia tree (MPT). Merkle Patricia tree is a type of Merkle tree (or also referred as "Merkle trie"), a Merkle tree is a type state tree, and a state tree is a type of data structure. A Merkle tree is a binary tree comprising a set of nodes with: a large number of leaf nodes at the bottom of the tree that contain the underlying data, a set of intermediate nodes each of which is the hash of its two child nodes, and a single state root node, also formed from the hash of its two child node, representing the top of the tree. The data at the bottom of the tree is generated by splitting the to-be-stored data into chunks, then splitting the chunks into buckets, and then taking the hash of each bucket and repeating the same process until the total number of hashes remaining becomes only one: the root hash. This tree is required to have a key for every value stored inside it. Beginning from the state root node of the tree, the key should indicate which child node to follow to get to the corresponding value, which is stored in the leaf nodes. In ethereum, the key/value mapping for the state tree is between addresses and their associated accounts, including the balance, nonce, codeHash, and storageRoot for each account (where the storageRoot is itself a tree). This same tree structure is used also to store transactions and receipts. For example, every block has a "header" which stores the hashes of the state root nodes of three different Merkle tree structures, including: state tree, transaction tree, receipt tree. Though the state tree is used as an example, various other trees and data structures can be used in the disclosed systems and methods.

Figure 2:
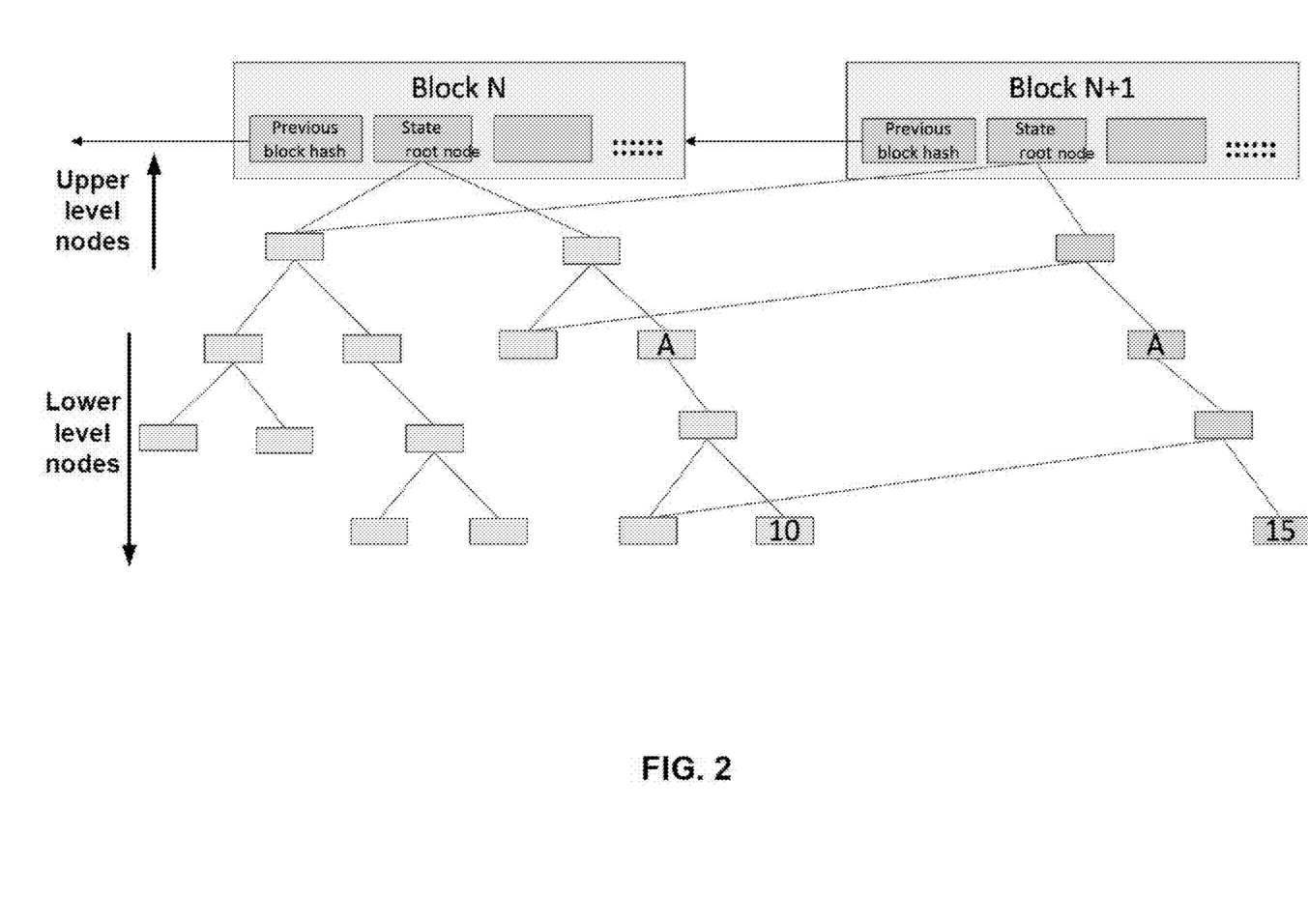
FIG. 2 illustrates two exemplary blocks of a blockchain and corresponding state trees, in accordance with various embodiments.

Referring to FIG. 2, FIG. 2 illustrates two blocks (block N and block N+1) in an exemplary blockchain and corresponding state trees, according to various embodiments. The nodes shown in FIG. 2 may refer to nodes in data structures, as opposed to Node 1, Node A, and the like which are devices known as blockchain nodes. As shown, each block contains the hash of the previous block, creating the chain of blocks. The state root node in block N (and any block) contains a summary of the state of all the accounts (external and contracts) in the entire blockchain system. The state root node may be represented by a root hash. Each block may store the root hash and the state tree may be obtained by querying a database based on the root hash, and the block may not have to store the entire state tree.

For example, account A is one of the accounts participated in transactions, and account A can be found at a certain location under the state root node of block N. Before the new block N+1 is added, the block N is the latest node of the blockchain. Account A's node branches into various nodes storing information of the account, for example, a balance of 10 ethers. Assuming that by the time the new block N+1 is mined and attached to the blockchain, there has been only one change in the system: an addition of 5 ethers to account A. The change is shown by the newly computed hashes (in the state tree of the block N+1) that lead up to the new state root node of the block N+1, while other child nodes are mapped from the previous block. After the transaction, the account balance of account A is updated to 15 ethers at the same node location under the state root node. The MPT structure now shows its utility, because it allows for the quick calculation of the state tree root after a change without the need to compute the entire tree.

By providing the state root node in a block, as a part of accepting this new block and confirming the transactions within it, all blockchain nodes comprising the blockchain system must arrive at the same view of the state of the entire system. Thus, each blockchain node in the system, as a part of validating a mined block before including it in the blockchain, must independently run through the new transactions and computations (if some of these transactions are directed at contracts), update the individual states of all accounts, and arrive at the same end result.

Another benefit of using a Merkle Patricia tree is that the state root node of this structure is cryptographically dependent on the data stored in the tree, and so the hash of the state root node can be used as a secure identity for this data. Every function (put, modify, and delete) performed on a tree in ethereum utilizes a deterministic cryptographic hash. Since the block header includes the root hashes of the state, transactions, and receipts trees, any blockchain node can validate a small part of state of ethereum without needing to store the entire state, which can be potentially unbounded in size. The unique cryptographic hash of a tree's state root node can be used as evidence that the tree has not been tampered with. Further, updating the tree is efficient. For instance, if a blockchain node wants to add, modify, or delete a leaf, the blockchain node can modify the leaf and then update every node on the path from it to the tree's root without having to changing related portions of paths in the same tree.

In transactions, the state in header needs to be frequently updated. For example, the balance and nonce of accounts are often changed, new accounts are frequently inserted, and keys in storage are frequently inserted and deleted. Transaction execution is achieved by updating the state tree. If the execution succeeds, the state tree update is submitted, and no further change is made. If the execution fails, the state tree reverts back to the original state before the execution.

Figure 3A:
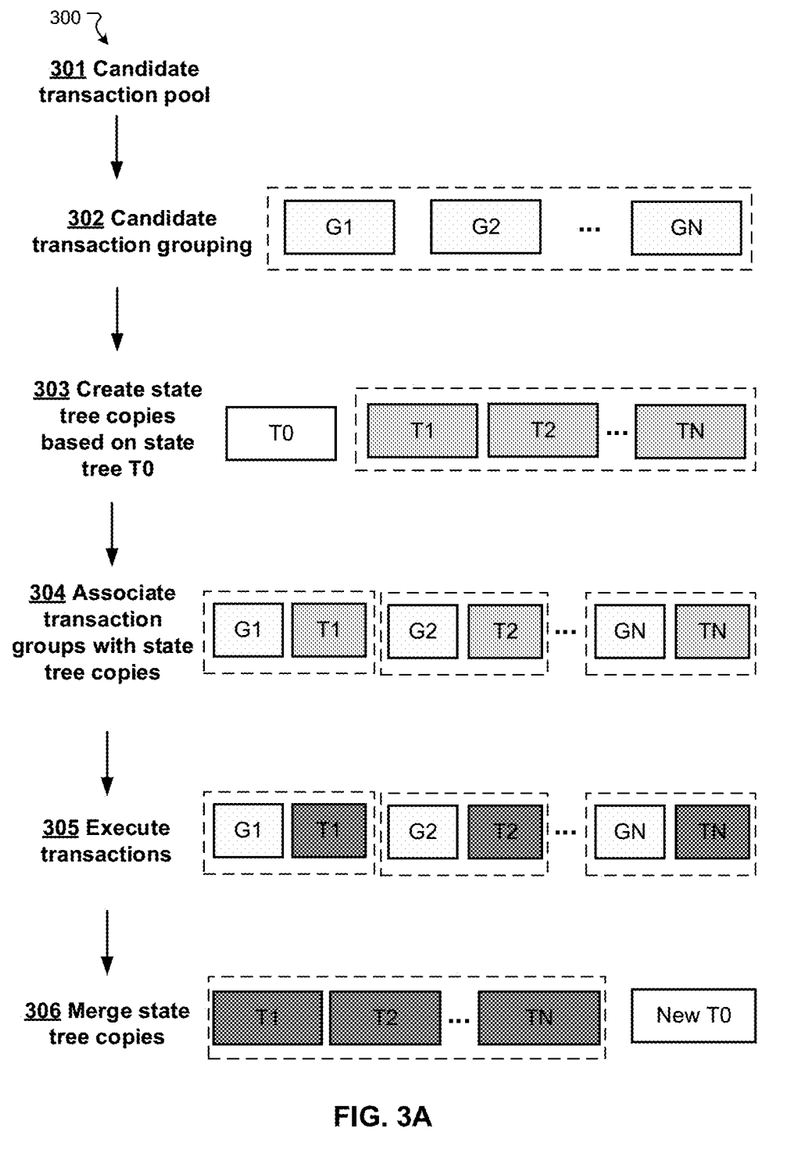
FIG. 3A illustrates a flowchart of an exemplary method for parallel-processing blockchain transactions, in accordance with various embodiments.
Figure 3B:
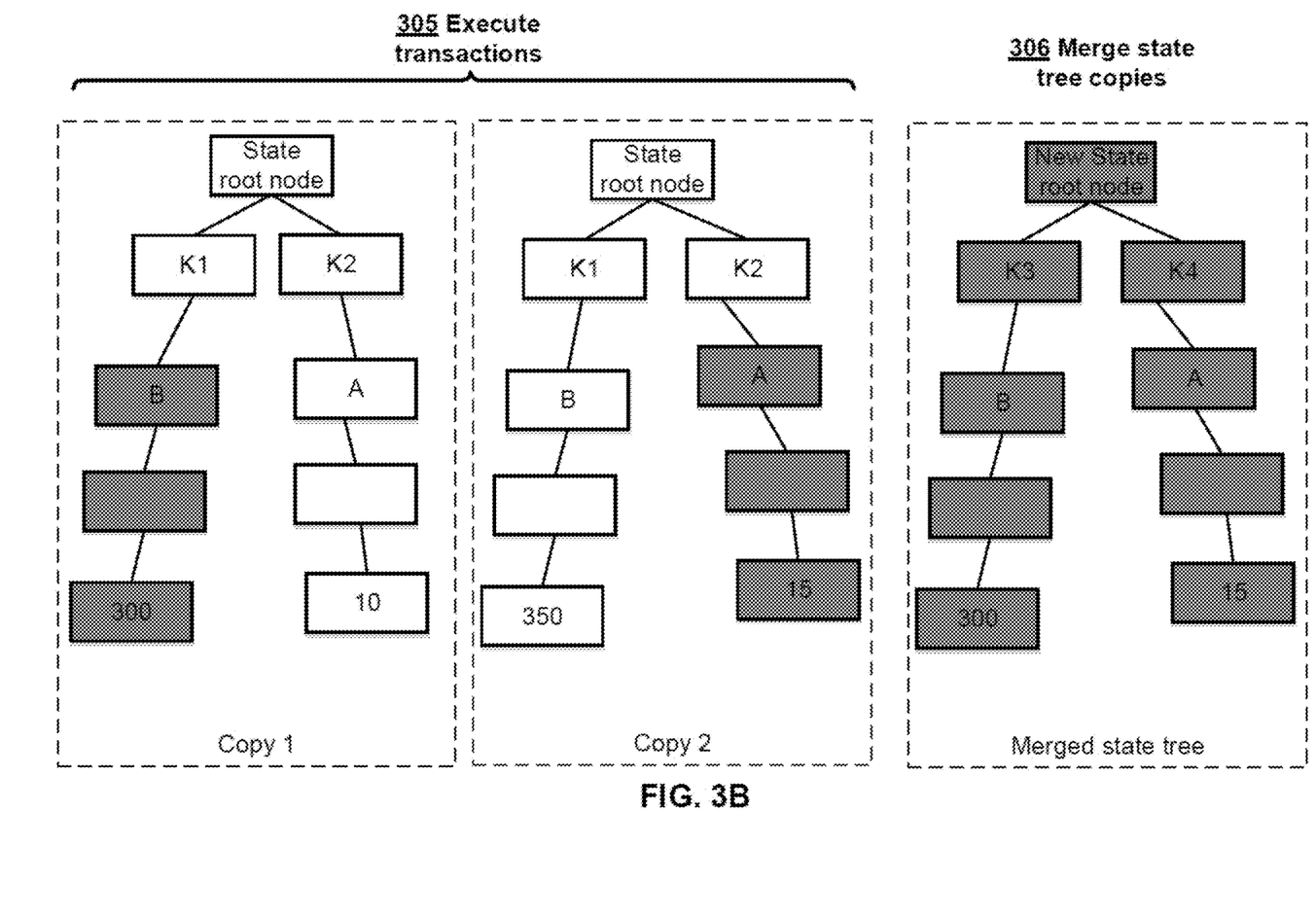
FIG. 3B illustrates an exemplary merge of two copies of state tree, in accordance with various embodiments.

FIG. 3A illustrates exemplary steps 300 for parallel-processing blockchain transactions, in accordance with various embodiments. The steps 300 may be implemented by one or more components (e.g., node A, node 1, a combination of node A and node 1, node 2, node i) of the system 100 of FIG. 1. To illustrate certain steps in FIG. 3A, FIG. 3B illustrates an exemplary merge of two copies of state tree, in accordance with various embodiments. The operations presented below are intended to be illustrative. Depending on the implementation, the exemplary steps may include additional, fewer, or alternative steps performed in various orders or in parallel.

At step 301, multiple candidate transactions may be submitted for mining. The candidate transactions may be stored in a pool database.

At step 302, the candidate transactions may be grouped into various independent groups (e.g., transaction groups G1, G2, . . . , GN). "Independent" may indicate that the groups do not interfere with one another. In some embodiments, any two or more of the candidate transactions each involving at least one common transaction account may be grouped under the same (transaction) group, and any two or more of the candidate transactions that do not involve any common transaction account may be grouped under different (transaction) groups. For example, for a pool of candidate transactions, A sends something to B, B sends something to C, and D sends something to E, the transactions between A and B and between B and C can be grouped together under a first group since B is the common transaction account involved in both transactions, and the transaction between D and E can be put in a second group since C and D are not involved in either of the two transactions in the first group.

At step 303, copies of at least a portion of the state tree of the current block (the latest block of the blockchain) may be created. The state tree of the current block may be denoted as T0, and the copies may be denoted as T1, T2, . . . , TN. The number of copies may correspond to the number of independent groups. For example, copies of the root hash of the state tree may be created, and through querying a database based on the copies of the root hash, copies of the state tree may be obtained.

At step 304, the independent groups may be respectively associated with the copies. For example, G1 is associated with T1 to have (G1, T1). Similarly, (G2, T2) . . . (GN, TN) may be obtained.

At step 305, transactions in each independent group Gi are executed based on the associated copy Ti. By execution, the associated copy of state tree is updated for the group. When each transaction is executed within each group, the corresponding copy of the state tree is updated (for successful transaction) or reverted to the original state (for failed transaction). In the tree structure, a parent node can be updated based on its child nodes. In FIG. 3A and FIG. 3B, the background of the same copy darkens to indicate the completion of transaction executions.

In some embodiments, the update may be applied to lower level nodes and not to upper level nodes (see FIG. 2 for the different levels of nodes). The lower level nodes may capture account changes such as any addition, deletion, and modification to the account, and changes within the accounts, such as balance changes. The upper level nodes leading to the state root node may be updated at the next step. For example, referring to FIG. 3B, G1 is associated with copy 1, and G2 is associated with copy 2. FIG. 3B shows copy 1 and copy 2 with their state tree copies updated based on G1 and G2 respectively. Darkened cells represent nodes that have been updated in transaction executions. In copy 1 and copy 2, node K1, node K2, and state root nodes are upper level nodes that may not need to update until the merge step. In copy 1, account B has been updated from 350 to 300, and account A has not been updated. In copy 2, account A has been updated from 10 to 15, and account B has not been updated. The update at the leaf node can propagate upwards to update the nodes above. The copies 1 and 2 are merged to obtain the merged state tree in the next step 306. In the merged state tree, the updates to account A and account B are combined. Further, updates to the upper level nodes can be propagated as K1 updates to K3, K2 updates K4, and the state root node updates to the new state root node.

Alternatively, in some embodiments, the upper level nodes including the state root nodes of the copies may be updated, and the upper level nodes may be updated again during the next merge step. For example, the state tree copies of the copy 1 and copy 2 may be updated based on G1 and G2 respectively all the way to the state root node, obtaining updated state root node 1 for copy 1 and updated state root node 2 for copy 2. The updated state root node 1 and updated state root node 2 (and similar updated state root nodes when there are more transaction groups) can be used in the next step to obtain their respective leaf nodes by querying a database and then combine the leaf nodes and propagate upwards to obtain a new state root node.

At step 306, after all N groups are executed, the updated copies of the state tree are merged to a new state tree T0. In one example, to merge the updated copies of the state tree, nodes (e.g., leaf nodes and/or intermediate nodes) that have been updated at step 305 may be incorporated into the state tree T0 (e.g., updating an old node value, adding a new node/account, deleting an old node/account). Since the original grouping made sure that the groups are independent, the merge does not change the updates performed at the step 305. After the merge, the leaf nodes may propagate upwards to obtain parent nodes and so forth until reaching the new state root node. For example, the upper level nodes may be updated to generate the state root node of the next block to add to the blockchain. The entire new state tree can also be obtained by querying a database based on the new state root node. Since the state tree is an MPT, the state root node is determined based on the node values and irrelevant to the order of the data update. As long as the grouping is correct, the state root node of the next block can be obtained accurately and quickly.

Figure 4:
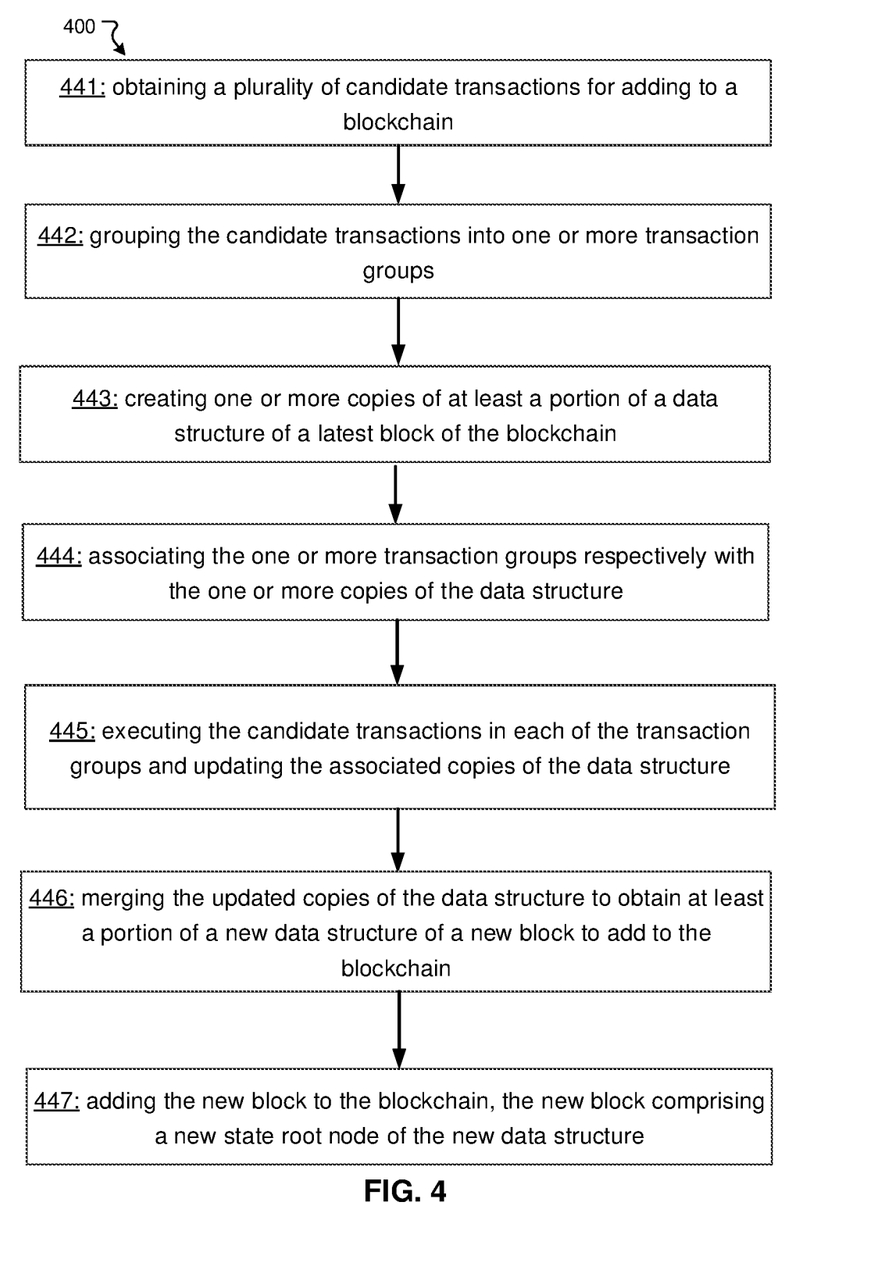
FIG. 4 illustrates a flowchart of an exemplary method for parallel-processing blockchain transactions, in accordance with various embodiments.

FIG. 4 illustrates a flowchart of an exemplary method 400 for detecting replay attack, according to various embodiments. The method 400 may be implemented by one or more components (e.g., node A, node 1, a combination of node A and node 1, node 2, node i) of the system 100 of FIG. 1. The method 400 may be implemented by one or more blockchain nodes. The method 400 may be implemented by a system or device (e.g., computer, server). The system or device may comprise one or more processors and one or more non-transitory computer-readable storage media (e.g., one or more memories) coupled to the one or more processors and configured with instructions executable by the one or more processors to cause the system or device (e.g., the processor) to perform the method 400. The operations of method 400 presented below are intended to be illustrative. Depending on the implementation, the exemplary method 400 may include additional, fewer, or alternative steps performed in various orders or in parallel.

Block 441 comprises: obtaining a plurality of candidate transactions for adding to a blockchain. For example, various lightweight nodes may submit candidate transactions to various full nodes to request verification and addition to the blockchain.

Block 442 comprises: grouping the candidate transactions into one or more transaction groups. In some embodiments, the one or more transaction groups are independent transaction groups. In some embodiments, grouping the candidate transactions into one or more transaction groups comprises: grouping two or more of the candidate transactions each involving at least one common transaction account under the same transaction group of the one or more transaction groups. For example, each of one or more of the independent transaction groups does not comprise a candidate transaction that is affected by another candidate transaction in another independent transaction group. For example, any two candidate transactions each involving the same transaction account may be grouped under the same transaction group. In some embodiments, grouping the candidate transactions into one or more transaction groups comprises: grouping two or more of the candidate transactions that do not involve any common transaction account under different transaction groups of the one or more transaction groups. For example, each of one or more of the independent transaction groups does not comprise two candidate transactions that involve completely different transaction accounts. For example, any two candidate transactions involving completely different transaction accounts may be grouped under different transaction groups.

Block 443 comprises: creating one or more copies of at least a portion of a data structure (e.g., state tree) of a latest block of the blockchain. In some embodiments, the data structure may comprise a state tree or another similar data structure. The portion of the data structure may comprise a state root node of a state tree or comprise lower level nodes of a state tree. For state tree, a state root node may be used to represent the state tree. Intermediate and leaf nodes of the state tree can be obtained by querying a database based on the state root node. Thus, a copy of the data structure or of a portion of the data structure may refer to (1) a copy of state root node, (2) a copy of the state root node and another portion of the data structure, (3) a complete copy of the data structure, etc.

In some embodiments, the blockchain is based on an Account/Balance Model; and the data structure comprises a Merkle Patricia tree comprising a single state root node stored in the latest block and a plurality of intermediate nodes and leaf nodes not stored in the latest block.

Block 444 comprises: associating the one or more transaction groups respectively with the one or more copies of the data structure (e.g., state tree). For example, the transaction groups may be respectively associated with the copies of the state root node of the latest block. The complete copies state tree can be obtained by querying the database.

Block 445 comprises: executing the candidate transactions in each of the transaction groups and updating the associated copies of the data structure (e.g., state tree). For example, the associated copies of the data structure (e.g., state tree) may be updated to execute the candidate transactions in each of the transaction groups. In some embodiments, executing the candidate transactions in each of the transaction groups and updating the associated copies of the data structure comprises: executing the candidate transactions in each of the transaction groups and updating the associated copies of the data structure in parallel.

In some embodiments, executing the candidate transactions in the corresponding transaction groups comprises: executing the candidate transactions in the corresponding transaction groups by a multi-core processor. That is, the transaction groups may be processed in parallel, for example, by the multi-core processor. Each core may be delegated to process one transaction group. Processing each transaction group may comprise processing the candidate transactions in the transaction group by updating the associated copy of the data structure. Thus, processing the transaction groups in parallel can significantly increase the overall processing speed.

In some embodiments, updating the associated copies of the data structure comprises: updating a balance of a transaction account in one of the associated copies of the data structure, removing the transaction account, and/or adding a new transaction account. The update may comprise various other changes to the various data structure nodes disclosed herein.

Block 446 comprises: merging the updated copies of the data structure to obtain at least a portion of a new data structure (e.g., a new state tree) of a new block to add to the blockchain. For example, the portion of the new data structure may comprise a new state root node. The obtained new data structure has a new state root node to include in the new block for adding to the blockchain. In some embodiments, merging the updated copies of the data structure comprises: updating at least the portion of the data structure of the latest block of the blockchain by combining and incorporating at least a portion of the updates made in the updated copies of the data structure. As discussed with reference to FIG. 3A and FIG. 3B, the changes to the various copies of the data structure may be merged to generate at least a portion of a new data structure. By updating from the leaf nodes to the intermediate node and upwards, the new state root node can be obtained.

Optional block 447 comprises: adding the new block to the blockchain. The portion of the new data structure comprises a new state root node, and the new block comprises the new state root node.

Figure 5:
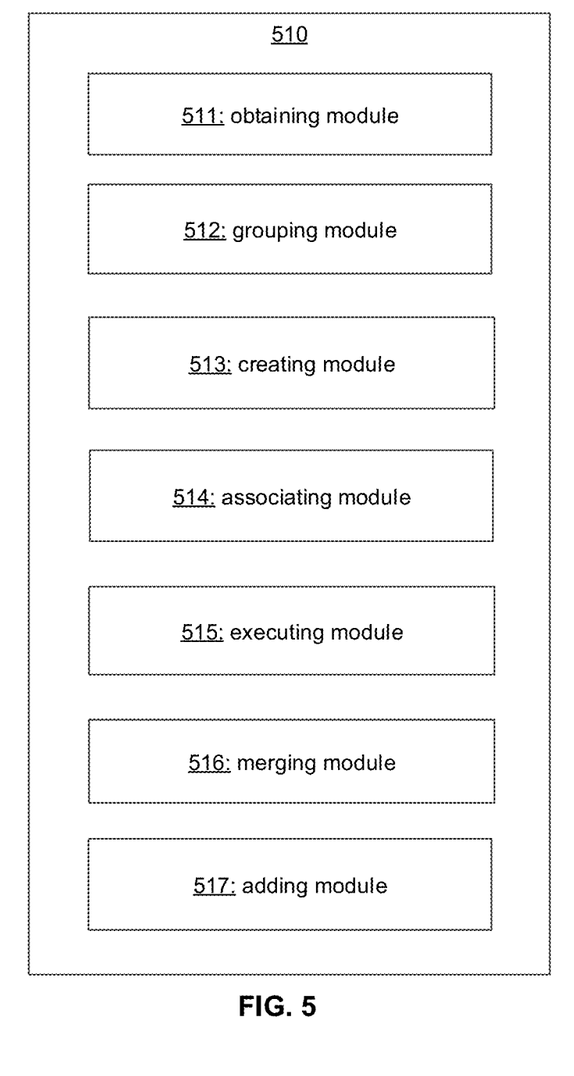
FIG. 5 illustrates a flowchart of an exemplary apparatus for parallel-processing blockchain transactions, in accordance with various embodiments.

FIG. 5 illustrates a block diagram of a system 510 for executing blockchain contracts, in accordance with some embodiments. The system 510 (e.g., a computer system) may be an example of an implementation of node 1, node 2, node A, node B, or a similar device, or a combination of any of the nodes and an additional device (e.g., node 1 and node A). For example, the method 400 may be implemented by the system 510. The system 510 may comprise one or more processors and one or more non-transitory computer-readable storage media (e.g., one or more memories) coupled to the one or more processors and configured with instructions executable by the one or more processors to cause the system or device (e.g., the processor) to perform the methods and operations described above, e.g., the method 400. The system 510 may comprise various units/modules corresponding to the instructions (e.g., software instructions).

In some embodiments, the system 510 may be referred to as an apparatus for parallel-processing blockchain transactions. The apparatus may comprise an obtaining module 511 for obtaining a plurality of candidate transactions for adding to a blockchain; a grouping module 512 for grouping the candidate transactions into one or more transaction groups; a creating module 513 for creating one or more copies of at least a portion of a data structure of a latest block of the blockchain; an associating module 514 for associating the one or more transaction groups respectively with the one or more copies of the data structure; an executing module 515 for executing the candidate transactions in each of the transaction groups and updating the associated copies of the data structure; and a merging module 516 for merging the updated copies of the data structure to obtain at least a portion of a new data structure of a new block to add to the blockchain. Optionally, the apparatus may further comprise an adding module 517 for adding the new block to the blockchain, wherein the portion of the new data structure comprises a new state root node, and the new block comprises the new state root node.

The techniques described herein are implemented by one or more special-purpose computing devices. The special-purpose computing devices may be desktop computer systems, server computer systems, portable computer systems, handheld devices, networking devices or any other device or combination of devices that incorporate hard-wired and/or program logic to implement the techniques. The special-purpose computing devices may be implemented as personal computers, laptops, cellular phones, camera phones, smart phones, personal digital assistants, media players, navigation devices, email devices, game consoles, tablet computers, wearable devices, or a combination thereof. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things. The various systems, apparatuses, storage media, modules, and units described herein may be implemented in the special-purpose computing devices, or one or more computing chips of the one or more special-purpose computing devices. In some embodiments, the instructions described herein may be implemented in a virtual machine on the special-purpose computing device. When executed, the instructions may cause the special-purpose computing device to perform various methods described herein. The virtual machine may include a software, hardware, or a combination thereof.

Figure 6:
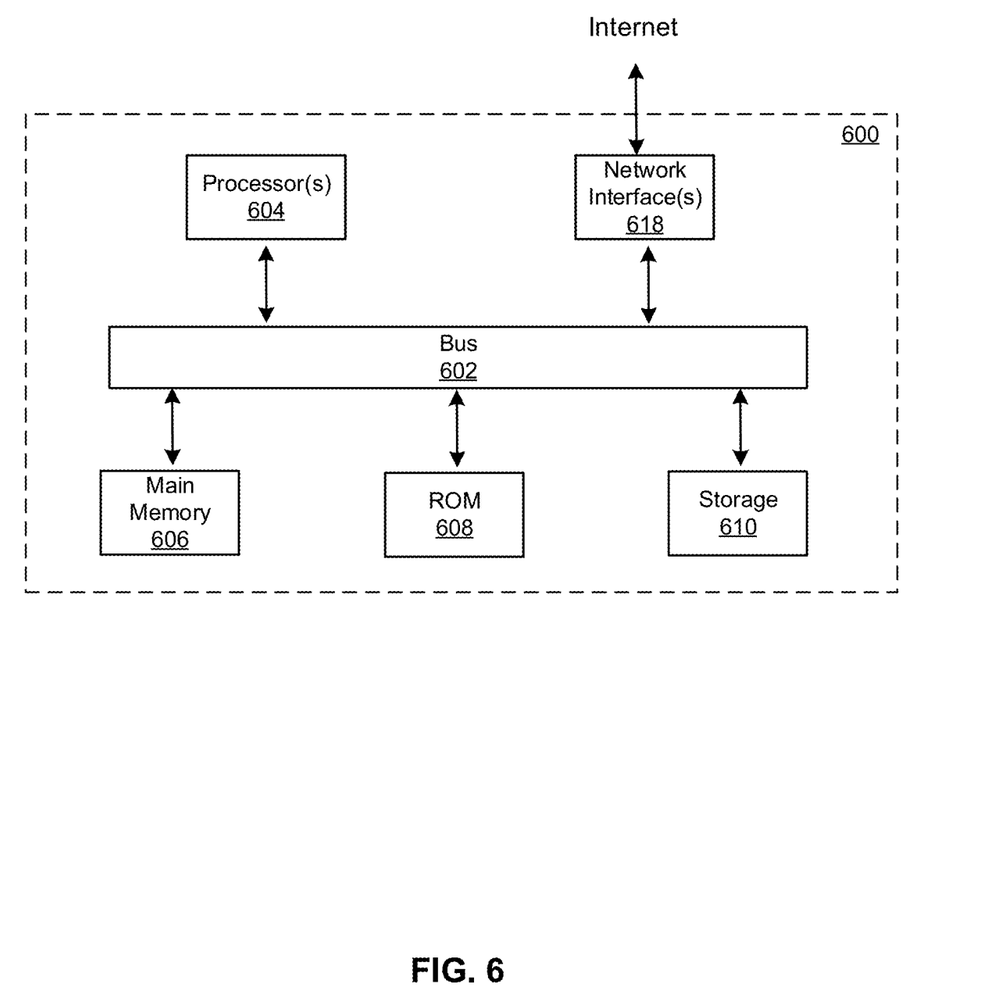
FIG. 6 illustrates a block diagram of an exemplary computer system in which any of the embodiments described herein may be implemented.

FIG. 6 is a block diagram that illustrates a computer system 600 upon which any of the embodiments described herein may be implemented. The system 600 may perform any of the methods described herein (e.g., the method 400). The system 600 may be implemented in any of the systems described herein (e.g., the system 100 or 510). The system 600 may be implemented in any of the nodes described herein and configured to perform corresponding steps for parallel-processing blockchain transactions. The computer system 600 includes a bus 602 or other communication mechanism for communicating information, one or more hardware processor(s) 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions executable by processor(s) 604. Main memory 606 also may be used for storing temporary variables or other intermediate information during execution of instructions executable by processor(s) 604. Such instructions, when stored in storage media accessible to processor(s) 604, render computer system 600 into a special-purpose machine that is customized to perform the operations specified in the instructions. The computer system 600 further includes a read only memory (ROM) 608 or other static storage device coupled to bus 602 for storing static information and instructions for processor(s) 604. A storage device 610, such as a magnetic disk, optical disk, or USB thumb drive (Flash drive), etc., is provided and coupled to bus 602 for storing information and instructions.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the operations, methods, and processes described herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The main memory 606, the ROM 608, and/or the storage device 610 may include non-transitory storage media. The term "non-transitory media," and similar terms, as used herein refers to media that store data and/or instructions that cause a machine to operate in a specific fashion, the media excludes transitory signals. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 600 also includes a network interface 618 coupled to bus 602. Network interface 618 provides a two-way data communication coupling to one or more network links that are connected to one or more local networks. For example, network interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicated with a WAN). Wireless links may also be implemented. In any such implementation, network interface 618 sends and receives electrical, electromagnetic or optical signals that carry digital data streams representing various types of information.

The computer system 600 can send messages and receive data, including program code, through the network(s), network link and network interface 618. In the Internet example, a server might transmit a requested code for an application program through the Internet, the ISP, the local network and the network interface 618.

The received code may be executed by processor(s) 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this specification. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The examples of blocks or states may be performed in serial, in parallel, or in some other manner Blocks or states may be added to or removed from the disclosed embodiments. The examples of systems and components described herein may be configured differently than described. For example, elements may be added to, removed from, or rearranged compared to the disclosed embodiments.

The various operations of methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some embodiments, the processors or processor-implemented engines may be located in a single geographic location (e.g., within a home environment, an office environment, or a server farm). In other embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in configurations may be implemented as a combined structure or component. Similarly, structures and functionality presented as a single component may be implemented as separate components. These and other variations, modifications, additions, and improvements fall within the scope of the subject matter herein. Furthermore, related terms (such as "first," "second," "third," etc.) used herein do not denote any order, height, or importance, but rather are used to distinguish one element from another element. Furthermore, the terms "a," "an," and "plurality" do not denote a limitation of quantity herein, but rather denote the presence of at least one of the articles mentioned.

Although an overview of the subject matter has been described with reference to specific embodiments, various modifications and changes may be made to these embodiments without departing from the broader scope of embodiments of the this specification. The Detailed Description should not to be taken in a limiting sense, and the scope of various embodiments is defined only by the appended claims, along with the full range of equivalents to which such claims are entitled.

The invention claimed is:

1. A computer-implemented method for parallel-processing blockchain transactions, comprising:
    obtaining, at a blockchain node, a plurality of candidate transactions for adding to a blockchain;
    grouping, at the blockchain node, the candidate transactions into a plurality of transaction groups;
    creating, at the blockchain node, a plurality of copies of at least a portion of a state tree data structure of a newest block of the blockchain;
    associating, at the blockchain node, the plurality of transaction groups respectively with the plurality of copies of the state tree data structure of the newest block of the blockchain, wherein the plurality of candidate transactions in the plurality of transaction groups have not yet been added the blockchain;
    executing, at the blockchain node, the candidate transactions in each of the transaction groups;
    respectively updating, at the blockchain node, the associated copies of the state tree data structure based on the execution of the candidate transactions in each of the transaction groups; and
    generating, at the blockchain node, a new state root node of a new block by at least merging the updated associated copies of the state tree data structure and propagating the updates to the new state root node.

2. The method of claim 1, wherein:
    the plurality of transaction groups are independent transaction groups.

3. The method of claim 1, wherein grouping the candidate transactions into the plurality of transaction groups comprises:
    grouping two or more of the candidate transactions each involving at least one common transaction account under a same transaction group of the plurality of transaction groups.

4. The method of claim 1, wherein grouping the candidate transactions into the plurality of transaction groups comprises:
    grouping two or more of the candidate transactions that do not involve any common transaction account under different transaction groups of the plurality of transaction groups.

5. The method of claim 1, wherein:
    the state tree data structure comprises a Merkle Patricia tree comprising a single state root node stored in the newest block and a plurality of intermediate nodes and leaf nodes not stored in the newest block.

6. The method of claim 1, wherein executing the candidate transactions in each of the transaction groups and updating the associated copies of the state tree data structure comprises:
    executing the candidate transactions in each of the transaction groups and updating the associated copies of the state tree data structure in parallel.

7. The method of claim 1, wherein executing the candidate transactions in each of the transaction groups comprises:
    executing the candidate transactions in each of the transaction groups by a multi-core processor.

8. The method of claim 1, wherein updating the associated copies of the state tree data structure comprises at least one of:
    updating a balance of a transaction account in one of the associated copies of the state tree data structure;
    removing the transaction account; or
    adding a new transaction account.

9. The method of claim 1, wherein merging the updated copies of the state tree data structure comprises:
    updating at least the portion of the state tree data structure of the newest block of the blockchain by combining and incorporating updates made in the updated copies of the state tree data structure.

10. The method of claim 1, further comprising:
    adding the new block to the blockchain.

11. A system for parallel-processing blockchain transactions, comprising one or more processors and one or more non-transitory computer-readable memories coupled to the one or more processors and configured with instructions executable by the one or more processors to cause the system to perform operations comprising:
    obtaining a plurality of candidate transactions for adding to a blockchain;
    grouping the candidate transactions into a plurality of transaction groups;
    creating a plurality of copies of at least a portion of a state tree data structure of a newest block of the blockchain;
    associating the plurality of transaction groups respectively with the plurality of copies of the state tree data structure of the newest block of the blockchain, wherein the plurality of candidate transactions in the plurality of transaction groups have not yet been added the blockchain;
    executing the candidate transactions in each of the transaction groups;
    respectively updating the associated copies of the state tree data structure based on the execution of the candidate transactions in each of the transaction groups; and
    generating a new state root node of a new block by at least merging the updated associated copies of the state tree data structure and propagating the updates to the new state root node.

12. The system of claim 11, wherein grouping the candidate transactions into the plurality of transaction groups comprises:
    grouping two or more of the candidate transactions each involving at least one common transaction account under a same transaction group of the plurality of transaction groups.

13. The system of claim 11, wherein grouping the candidate transactions into the plurality of transaction groups comprises:
    grouping two or more of the candidate transactions that do not involve any common transaction account under different transaction groups of the plurality of transaction groups.

14. The system of claim 11, wherein updating the associated copies of the state tree data structure comprises at least one of:
    updating a balance of a transaction account in one of the associated copies of the state tree data structure;
    removing the transaction account; or
    adding a new transaction account.

15. A non-transitory computer-readable storage medium configured with instructions executable by one or more processors to cause the one or more processors to perform operations comprising:
    obtaining a plurality of candidate transactions for adding to a blockchain;

grouping the candidate transactions into a plurality of transaction groups;

creating a plurality of copies of at least a portion of a state tree data structure of a newest block of the blockchain;

associating the plurality of transaction groups respectively with the plurality of copies of the state tree data structure of the newest block of the blockchain, wherein the plurality of candidate transactions in the plurality of transaction groups have not yet been added the blockchain;

executing the candidate transactions in each of the transaction groups;

respectively updating the associated copies of the state tree data structure based on the execution of the candidate transactions in each of the transaction groups; and generating a new state root node of a new block by at least merging the updated associated copies of the state tree data structure and propagating the updates to the new state root node.

16. The storage medium of claim 15, wherein grouping the candidate transactions into the plurality of transaction groups comprises:
grouping two or more of the candidate transactions each involving at least one common transaction account under a same transaction group of the plurality of transaction groups.

17. The storage medium of claim 15, wherein grouping the candidate transactions into the plurality of transaction groups comprises:
grouping two or more of the candidate transactions that do not involve any common transaction account under different transaction groups of the plurality of transaction groups.

18. The storage medium of claim 15, wherein updating the associated copies of the state tree data structure comprises at least one of:
updating a balance of a transaction account in one of the associated copies of the state tree data structure;
removing the transaction account; or
adding a new transaction account.

* * * * *